(12) United States Patent
Uddenberg et al.

(10) Patent No.: US 7,412,631 B2
(45) Date of Patent: Aug. 12, 2008

(54) METHODS AND STRUCTURE FOR VERIFYING DOMAIN FUNCTIONALITY

(75) Inventors: David T. Uddenberg, Colorado Springs, CO (US); Mark Slutz, Colorado Springs, CO (US); Brian J. Varney, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 505 days.

(21) Appl. No.: 11/224,850

(22) Filed: Sep. 13, 2005

(65) Prior Publication Data

US 2007/0061632 A1 Mar. 15, 2007

(51) Int. Cl.
G06F 11/00 (2006.01)

(52) U.S. Cl. .......................................... 714/47; 714/42

(58) Field of Classification Search .................... 714/47, 714/42

See application file for complete search history.

(56) References Cited

U.S. PATENT DOCUMENTS

| | | | |
|---|---|---|---|
| 6,954,712 B2* | 10/2005 | Bingham et al. ............ | 702/123 |
| 7,320,093 B2* | 1/2008 | Yagi ............................. | 714/50 |
| 2003/0184902 A1* | 10/2003 | Thiesfeld ...................... | 360/48 |
| 2006/0149881 A1* | 7/2006 | Clayton et al. .............. | 710/302 |
| 2006/0235937 A1* | 10/2006 | Wu et al. ..................... | 709/214 |
| 2007/0011373 A1* | 1/2007 | Marks et al. ................ | 710/104 |
| 2007/0064623 A1* | 3/2007 | Brahmaroutu ............. | 370/254 |
| 2007/0255870 A1* | 11/2007 | Chikusa et al. .............. | 710/74 |
| 2007/0294570 A1* | 12/2007 | Kalwitz et al. ................. | 714/9 |
| 2008/0010530 A1* | 1/2008 | Davies et al. ................. | 714/31 |
| 2008/0040564 A1* | 2/2008 | Kubo et al. .................. | 711/154 |

* cited by examiner

*Primary Examiner*—Marc Duncan
(74) *Attorney, Agent, or Firm*—Duft, Bornsen, & Fishman LLP (57) ABSTRACT

Methods and structures within a SAS expander for testing SAS devices and other SAS expanders in the SAS domain. Testing devices and expanders in the domain by operations performed within a SAS expander in the domain relieves the burden of such processing in attached host systems and adds flexibility for scheduling processing for test operation of devices and expanders in the domain. In one aspect hereof, the testing may be performed by a master SAS expander configured in the domain. The SAS expander may initiate testing of devices following completion of the SAS discovery process. Testing may also be initiated in response to events in the SAS domain not typically detected by attached host systems.

23 Claims, 4 Drawing Sheets

METHODS AND STRUCTURE FOR VERIFYING DOMAIN FUNCTIONALITY

BACKGROUND OF THE INVENTION

1. Field of the Invention

The invention relates generally to serial attached SCSI ("SAS") domains and more specifically to methods and structures for more easily detecting that devices in the SAS domain are properly functioning as they are discovered or otherwise detected in the SAS domain.

2. Discussion of Related Art

Small Computer Systems Interface ("SCSI") is a set of American National Standards Institute ("ANSI") standard electronic interface specification that allow, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

When a SAS domain starts up, one or more initiator devices perform a "discovery" process in accordance with the SAS specifications so that each SAS component may generate information indicative of the SAS domain topology. In other words, the discovery process specified by the SAS specifications permits each SAS device and each SAS expander in the domain to discover information about immediate neighbors coupled to its ports as well as information about other devices and expanders coupled to ports of neighboring components. Thus, each SAS device and SAS expander in a SAS domain may acquire information regarding the overall geometry or topology of the SAS domain.

The discovery process specified by the SAS specifications does not necessarily assure that each discovered device is properly functioning. Rather, the discovery process as specified in the SAS specifications calls for only detecting presence of the SAS component—regardless of whether it is functioning properly in other respects. Thus the discovery process could discover a device that is functional enough to respond to the exchanges associated with the discovery process but not fully functional to perform user/system generated requests. For example, a disk drive may respond adequately to messages associated with the discovery process but may be incapable or reading information from the disk drive recording media.

Some present techniques perform a test sequence after the discovery process is completed. As presently practiced, a host system application or system process is launched that tests the discovered devices to assure that each device appears to operate properly to process I/O requests. Such a host system process consumes valuable resources in the host system. When launched from a host system, the process may be started at host system power up or host system reset. However, there may be other events in the operation of the SAS domain not readily known to the host system that could require similar testing. For example, replacement of devices in the domain, receipt of broadcast change primitives, sensing a link being temporarily down and then restored to normal operation, etc. Host systems are not necessarily informed of these events in any manner that would allow re-launching the test process.

It is therefore evident from the above discussion that a need exists for improved solutions in a SAS domain to rapidly identify whether devices associated with a SAS domain are properly operable without imposing significant burden on resources of the attached host systems.

SUMMARY OF THE INVENTION

The present invention solves the above and other problems, thereby advancing the state of the useful arts, by providing methods and structures associated with a SAS expander in a SAS domain for reliably determining functionality of SAS components in the SAS domain. The SAS expander enhanced in accordance with features and aspects hereof senses changes in the SAS domain topology or configuration and initiates testing in response thereto to test operational status of other components in the SAS domain. Thus features and aspects hereof relieve the host system of responsibility for determining operational status of components of the SAS domain. Further, moving this responsibility into a SAS expander in the SAS domain permits added flexibility for sensing changes in the domain for which testing should be repeated or re-started.

A feature hereof therefore provides a method for testing SAS components in a SAS domain having a SAS expander, the method comprising: sensing within the SAS expander a change in the SAS domain; and testing operation of a SAS component in the SAS domain in response to the sensed change to determine operational status of the SAS component.

Another aspect hereof further provides that the step of sensing further comprises sensing each new SAS component discovered by completion of a SAS discovery process performed within the SAS domain, and provides that the step of testing further comprises testing operation of each new SAS component.

Another aspect hereof further provides that the step of testing further comprises receiving self-test information from the SAS component.

Another aspect hereof further provides that the step of sensing further comprises sensing a reset of the SAS expander.

Another aspect hereof further provides that the step of sensing further comprises sensing receipt within the SAS expander of a BROADCAST-CHANGE primitive.

Another aspect hereof further provides that the step of sensing further comprises sensing restoration of a SAS PHY to an operable status.

Another aspect hereof further provides that the step of testing further comprises: issuing a command to the SAS component; and determining a result of the issued command within the SAS component, and provides that the command is non-destructive with respect to data stored in the SAS component.

Another aspect hereof further provides that the SAS component is a SCSI device and provides that the non-destructive command is selected from the group of SCSI commands consisting of: Test Unit Ready, Inquiry, Read Capacity, Write Buffer, Read Buffer, and Read.

Another aspect hereof further provides that the SAS component is a SATA device and provides that the non-destructive command is selected from the group of SATA commands consisting of: Execute Drive Diagnostics, Set Features, Read FPDMA Queued, Write Buffer, Read Buffer, and Read DMA Ext.

Another feature hereof provides a SAS domain system comprising: a SAS initiator device; and a SAS expander communicatively coupled to the SAS initiator device wherein the SAS expander further comprises: a monitoring component to sense changes in SAS components in the SAS domain; and a testing component to test functionality of SAS components in the SAS domain in response to sensing a change in the SAS domain, wherein the monitoring component and the testing component are operable within the SAS expander without interaction with the SAS initiator device.

Another aspect hereof further provides a notification component for notifying the SAS initiator device of the functionality of one or more SAS components of the SAS domain.

Another aspect hereof further provides that the testing component is operable to issue a non-destructive command to the SAS component and to determine functionality of the SAS component based on the response of the SAS component to the issued command.

Another aspect hereof further provides that the SAS component is a SCSI device and wherein the non-destructive command is selected from the group of SCSI commands consisting of: Test Unit Ready, Inquiry, Read Capacity, Write Buffer, Read Buffer, and Read.

Another aspect hereof further provides that the SAS component is a SATA device and wherein the non-destructive command is selected from the group of SATA commands consisting of: Execute Drive Diagnostics, Set Features, Read FPDMA Queued, Write Buffer, Read Buffer, and Read DMA Ext.

DETAILED DESCRIPTION OF THE DRAWINGS

Figure 1:
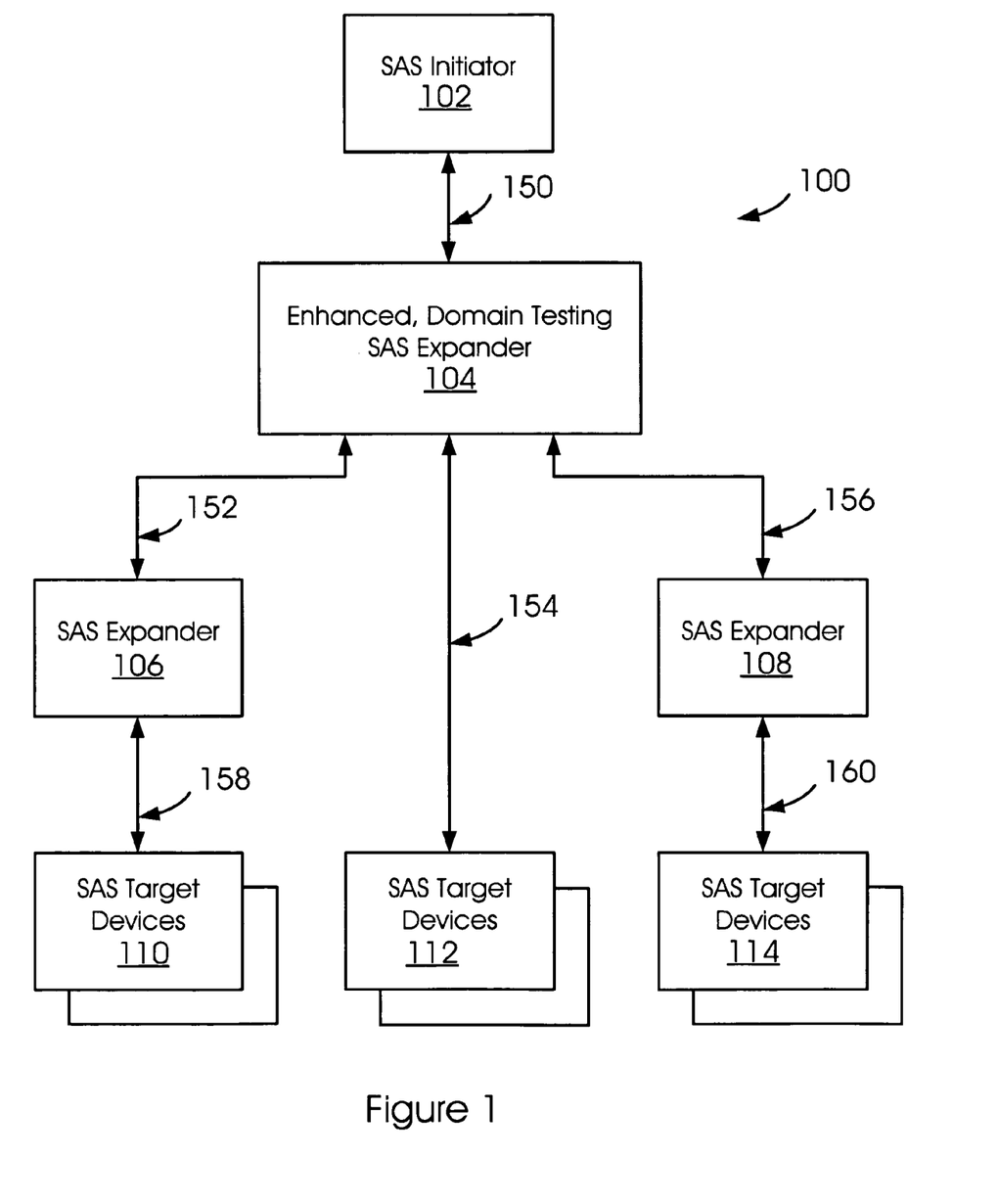
FIG. 1 is a block diagram of a SAS domain embodying features and aspects hereof for SAS expander testing of devices in a SAS domain.

FIG. 1 is a block diagram showing a SAS domain 100 including a SAS expander 104 enhanced in accordance with features and aspects hereof to perform operational status testing of other components of the SAS domain. SAS domain 100 generally includes one or more SAS initiator devices 102 such as, for example, an adapter within a host computer system. The SAS domain 100 may also include one or more SAS expanders 104, 106, and 108, some or all of which may be enhanced in accordance with features and aspects hereof. The SAS domain 100 may further include one or more SAS target devices 110, 112, and 114 coupled through ports of various SAS expanders to the SAS initiator device 102.

As noted above, in general, a SAS initiator device 102 initiates communications with one or more SAS target devices 110, 112, and 114 to transfer information therebetween. For example, typical SAS target devices may include disk drives or other computer data storage devices. Thus, SAS initiator device 102 (e.g., a host computer system) may initiate an exchange of information with a SAS target device 110, 112, or 114 (e.g., a disk drive or other computer storage device) to store information thereon or to retrieve previously stored information therefrom.

The collection of SAS expanders 104, 106, and 108 and associated communication paths 150 through 160 provide communication paths through the SAS domain. The SAS expanders therefore generally provide a switched network connection between one or more SAS initiators 102 and one or more SAS target devices 110, 112, and 114. The switched communication path through of the SAS domain may typically include redundant paths between each SAS initiator device 102 and each SAS target device 110, 112, and 114. Alternate redundant paths provide for enhanced reliability in the event of failure of one or more communication paths. By way of example as shown in FIG. 1, SAS initiator device 102 communicates with expanders and target devices in the SAS domain via communication path 150. SAS target devices 110 communicate with initiators and expanders via path 158, SAS target devices 112 communicate with initiators and expanders via path 154, and SAS target devices 114 communicate with initiators and expanders via path 160. Within the SAS domain hierarchically arranged SAS expanders 104, 106, and 108 may communicate via communication paths 152 and 156.

SAS expander 104 is enhanced in accordance with features and aspects hereof to sense changes in the SAS domain and, in response thereto, to perform functionality testing of SAS components in the domain. Where prior techniques performed such testing from within a host computer system (as a SAS initiator device), features and aspects herein provide for such testing by operation of a SAS expander within the SAS domain. Shifting this processing to the SAS expander reduces the responsibility of the host computer system in this regard and enhances the flexibility of decisions to re-test the SAS components of the domain based on changes sensed in the SAS domain. Often a SAS expander is better equipped to sense a variety of events that signal a possible change in the SAS domain configuration or topology. Therefore, features and aspects hereof enhance the flexibility of such decision making to permit re-testing of components in the domain responsive to most any change thereof.

Those of ordinary skill in the art will readily recognize a variety of SAS domain topologies in which one or more SAS initiators 102 may communicate with one or more SAS target devices 110, 112, and 114. A SAS domain utilized for such interconnections may provide any number of switched communication paths between the various initiator devices 102 and the target devices 110, 112, and 114. FIG. 1 is therefore intended merely as exemplary of one possible configuration or topology of a SAS domain including a SAS expander 104 enhanced in accordance with features and aspects hereof. Numerous equivalent topologies and configurations will be readily apparent to those of ordinary skill in the art including any number of initiator devices, target devices, expanders, and associated communication paths. Still further, those of ordinary skill in the arts will recognize that the SAS target devices may be either standard SCSI protocol SAS devices or may be SATA protocol devices coupled through the SAS domain. Again, those of ordinary skill in the art will readily recognize the numerous design choices for configuring such a network.

Figure 2:
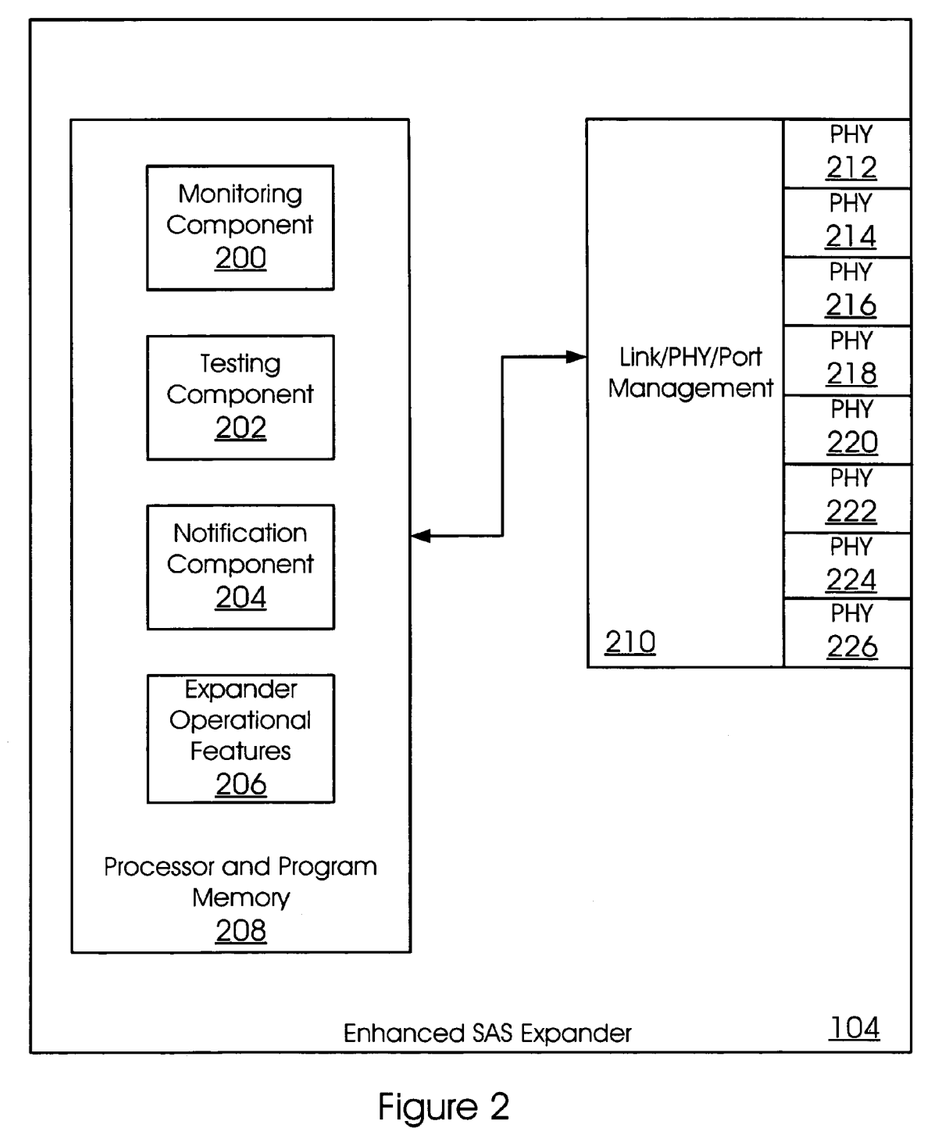
FIG. 2 is a block diagram describing further exemplary details of an exemplary enhanced SAS expander in accordance with features and aspects hereof to perform SAS component testing from within a SAS expander of the SAS domain.

FIG. 2 is a block diagram providing additional exemplary details of a SAS expander 104 as in FIG. 1 enhanced in accordance with features and aspects hereof. Enhanced SAS expander 104 may include a general or special purpose processor and associated program memory 208 for overall control of the expander 104. Processor and program memory 208 suitably configured or programmed then interacts with link management element 210—often implemented as customized circuitry for low level control of a plurality of link or PHYs 212 through 226. The particular implementation of link management 210 as customized circuits and/or as general control processing of element 208 is a matter of design choice well known to those of ordinary skill in the art. Specifically, each function may be performed by suitably programmed general or special purpose processors and/or by suitably designed custom application specific circuitry.

Processor and program memory 208 are shown with exemplary functional components representing common functionality associated with features and aspects hereof. Monitoring component 200 is generally operable to monitor the configuration and topology of the SAS domain to detect changes therein. As discussed further herein below, such changes may be detected by, for example, recognizing new SAS components detected during a discovery process operating within the SAS domain, sensing receipt of a broadcast change primitive broadcast through the SAS domain, and other conditions on the SAS domain through which the monitoring component 200 may sense changes in the SAS domain configuration or topology.

Testing component 202 is generally operable in response to detection of a change in the SAS domain sensed by operation of element 200. Testing component 202 is operable to perform appropriate testing on components within the SAS domain to determine the functionality of components therein. Where such testing features were previously performed within a host computer system, features and aspects hereof provide for such testing localized within the processing capability of an enhanced SAS expander in the SAS domain. As noted above, performing this testing feature outside of the host computer system offloads the responsibility from the host computer system and also provides added flexibility in determining when such testing should be performed.

In general, the testing performed by component 202 may include issuing commands to identified SAS components in the SAS domain and detecting the success or failure of the SAS component in performing the issued commands. Depending upon specific application requirements, any suitable commands may be issued to evaluate the functionality of each SAS component. For example, the particular commands to be issued may depend upon the particular type of SAS component being tested and the particular application of features and aspects hereof to perform such functionality testing. In general, it is preferable that the commands issued are nondestructive with regard to any user or system data stored on the SAS component. For example, it would not be generally appropriate to perform random write operations on a SAS component disk drive when it is possible that critical user or system data has been stored on that disk drive. However, various nondestructive command sequences as discussed further herein below may be generated to adequately evaluate the functionality of a SAS component. As noted above, the SAS component tested are generally SAS target devices or SATA target devices in the SAS domain.

Notification component 204 is generally operable to notify one or more SAS initiator devices associated with the SAS domain regarding any relevant status derived from the operation of testing component 202. Previous designs relied upon the host system (i.e., and initiator device) to perform the functionality testing and to evaluate the test results directly. In accordance with features and aspects hereof, the SAS expander performs the functional testing and the notification component 204 appropriately notifies any SAS initiators associated with the SAS domain of the test results. The SAS initiator device (e.g., host computer system) may then avoid time consuming error recovery procedures caused by improper access to a functionally inoperable SAS component of the SAS domain.

Element 206 represents other standard operational features of SAS expander 104 useful in operation of any SAS expander in a SAS domain. Such standard operational features of a SAS expander are well known to those of ordinary skill in the art and may include, for example, processing associated with SAS discovery techniques as well as communication path switching and connectivity. As discussed further herein below, sensing and testing features and aspects hereof may be operable in response to performing a SAS discovery process within the SAS domain such as by processing of element 206. This and other events as discussed further herein below may trigger the sensing of a change in the SAS domain and hence a cause for repeating testing of components of the SAS domain.

Those of ordinary skill in the art will readily recognize that the structures shown in FIGS. 1 and 2 are intended merely as exemplary of a SAS domain in which features and aspects hereof may be beneficially applied. In particular, FIGS. 1 and 2 show an exemplary structure for an enhanced SAS expander in a SAS domain in which functional testing features may be incorporated for evaluating functionality of SAS components of the SAS domain. Numerous equivalent structures and systems will be readily apparent to those of ordinary skill in the art.

Figure 3:
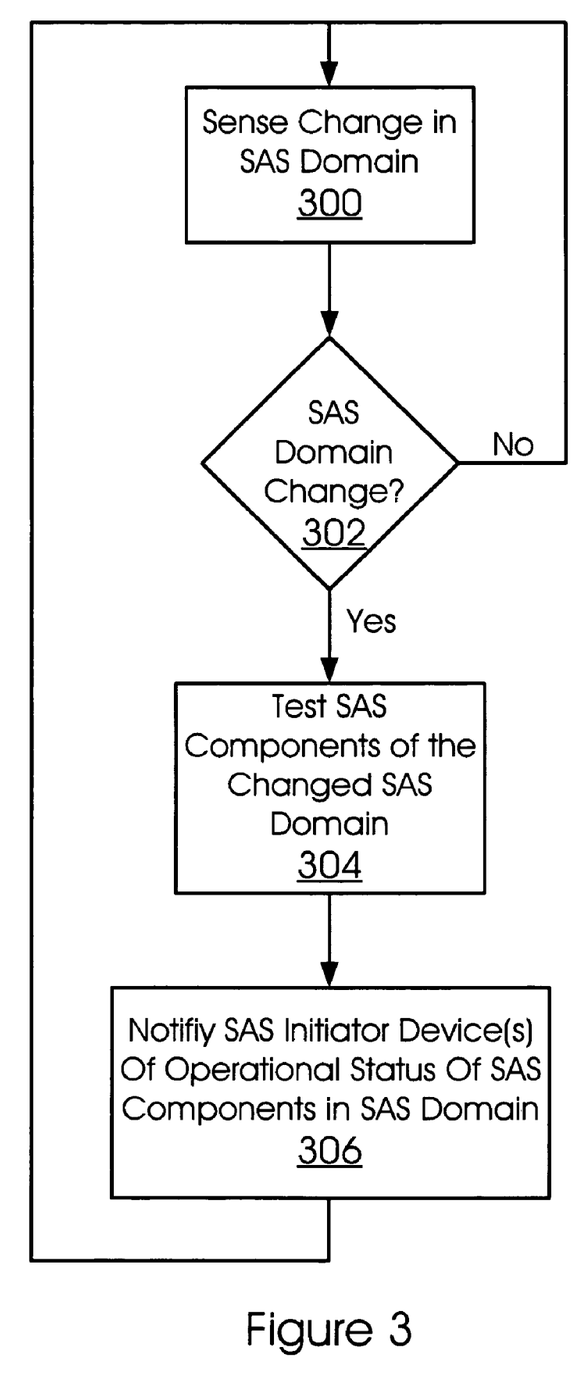
FIG. 3 is a flowchart describing an exemplary method in accordance with features and aspects hereof to perform SAS component testing from within a SAS expander of the SAS domain.

FIG. 3 is a flowchart broadly describing a method in accordance with features and aspects hereof to perform functionality testing of components in a SAS domain from within an enhanced SAS expander in the SAS domain. The method of FIG. 3 is generally operable within one or more enhanced SAS expanders in the SAS domain.

Element 300 is first operable to sense whether any aspects of the SAS domain have changed such that functionality testing should be performed by the enhanced SAS expander. As discussed further herein below, numerous events and messages may be associated with sensing such a change of the SAS domain. Element 302 is then operable to determine whether element 300 has sensed such a domain change. If not, processing continues looping through elements 300 and 302 until a change has been sensed in some aspect of the SAS domain.

Upon sensing such a change in the SAS domain configuration or topology, element 304 is then operable to perform testing of components in the changed SAS domain. As noted herein, such testing may include a variety of commands issued to the SAS component to be tested followed by evaluation of the response of the SAS component to determine whether the SAS component is fully functional or failing in some manner. Some SAS components may include self test features such that the instruction issued by the enhanced SAS expander to the SAS component is merely a request to retrieve current self test results from the SAS component to be tested. In other cases, specific operational commands may be forwarded to the SAS component and the response thereto may be monitored by the testing component of the enhanced SAS expander.

Where the SAS component to be tested is a SCSI device, test commands to be issued may include, for example, Test Unit Ready, Inquiry, Read Capacity, Write Buffer, Read Buffer, and Read. Where the SAS component to be tested is a SATA device, exemplary commands to be issued for testing functionality thereof may include, for example, Execute Drive Diagnostics, Set Features, Read FPDMA Queued, Write Buffer, Read Buffer, and Read DMA Ext. In general, the commands issued for purposes of testing functionality of a SATA or SAS device are commands that are inherently nondestructive in nature. Where the SAS component is, for example, a computer data storage device such as a disk drive or tape drive, commands that may risk destruction of previously recorded data would be undesirable for use as commands to test functionality. The commands listed above by way of example are nondestructive in nature of such that any previously recorded user or system data will remain intact.

Element 304 is therefore operable to perform functionality testing of SAS components in response to the sensing of a change in the SAS domain and further is responsible for gathering the results of the functionality testing performed thereby. Element 306 is then operable to notify one or more SAS initiator devices associated with this SAS domain of the operational status of the various SAS components in the domain. As noted above, such notification relieves the SAS initiator device (e.g., a host computer system) from responsibility for sensing appropriate times, events, or changes for retesting SAS components and for the actual testing thereof. Processing of the method of FIG. 3 then continues looping back to element 300 to await a next sensed change in the configuration or topology of the SAS domain.

As noted above, the processing of FIG. 3 heretofore was performed within an initiator device of the SAS domain (e.g., typically a host computer system). In addition to relieving the SAS initiator device of such testing responsibility, as noted above, the SAS expander may more readily and flexibly determine appropriate events, changes, and times for running and re-running the functionality testing. In particular, element 300 of FIG. 3 may sense any number of conditions or events to determine that it is appropriate to run or rerun functional testing of SAS components in the domain.

Figure 4:
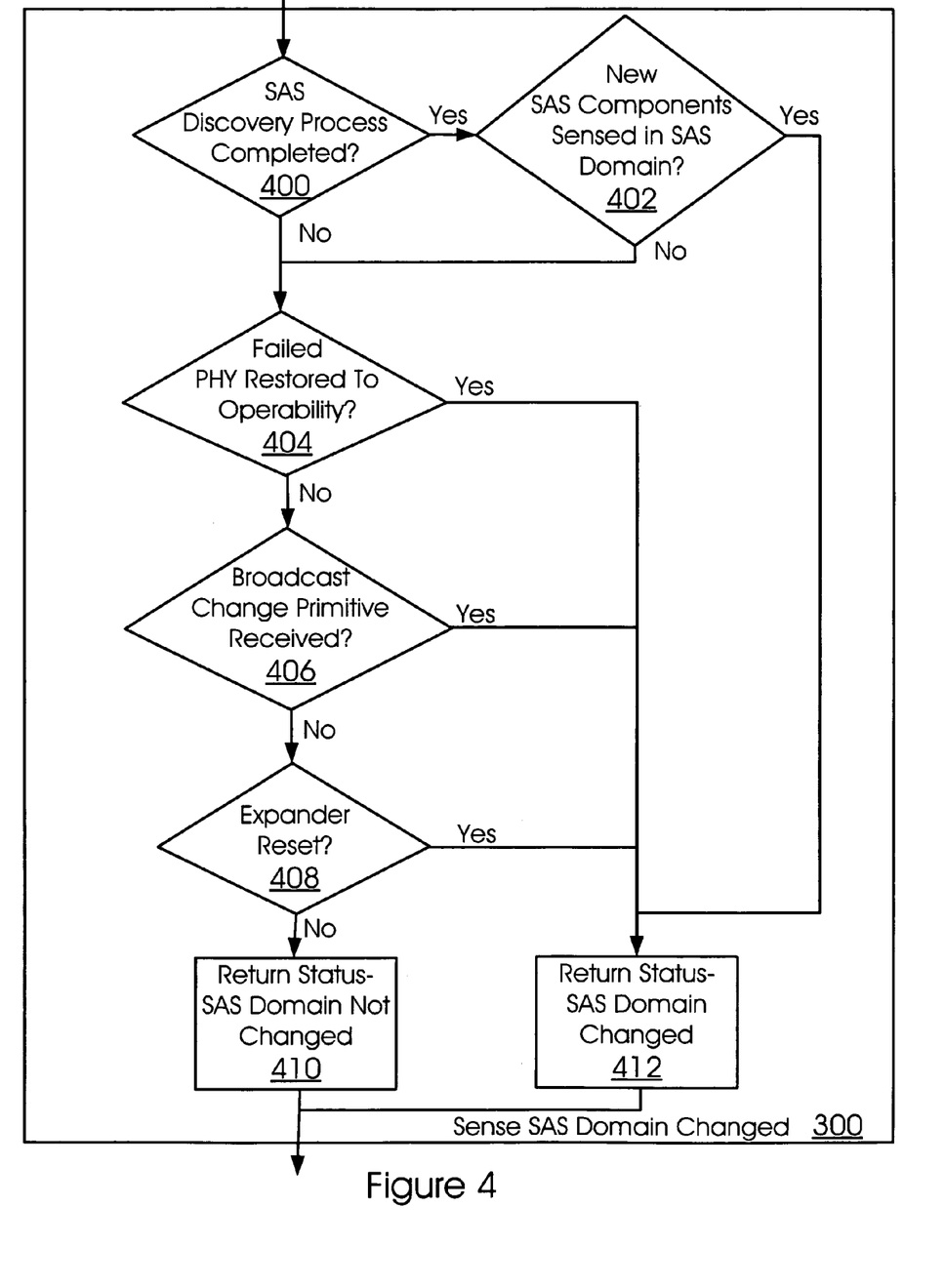
FIG. 4 is a flowchart describing further exemplary details of a step of the method of FIG. 3 to sense a change in the SAS domain that may trigger re-testing of SAS components of the SAS domain.

FIG. 4 provides additional exemplary details of processing of element 300 of FIG. 3 to determine whether a SAS domain has changed in a significant manner to require testing or retesting of functionality of SAS components therein. Element 400 of FIG. 4 is first operable to determine whether a standard SAS discovery process has been initiated or completed in the SAS domain. As is well known to those of ordinary skill in the art, various events in a SAS domain may cause a SAS initiator device or other device in the SAS domain to initiate a SAS discovery procedure to discover the current configuration and topology of components in the SAS domain. If element 400 determines that a discovery procedure has completed, element 402 is then operable to determine whether any new SAS components have been sensed in the SAS domain topology and configuration. If so, element 412 is operable to return a status to the invoking procedure to indicate that an appropriate change has been sensed in the SAS domain such that testing of SAS components should be initiated or repeated.

If element 402 determines that no new SAS components have been sensed, or if element 400 determines that no SAS discovery process was initiated, element 404 is then operable to determine whether a previously failed PHY or link associated with the SAS expander has been restored to operability. If so, element 412 is operable as discussed above to return a positive status indicating that the SAS domain has potentially changed and that functionality testing should be rerun. Otherwise, processing continues with element 406. Element 406 then determines whether a broadcast change primitive has been received at the SAS expander broadcast from some other component of the SAS domain. If so, element 412 is operable as above to return a positive status indicating an appropriate change has been sensed such that functional testing should be rerun. Otherwise, element 408 is operable to determine whether a reset has been received by the SAS expander signaled by some other component of the SAS domain. If so, element 412 is operable as above to indicate that functional testing should be rerun. Otherwise, element 410 is operable to return a negative status indicating that no relevant change has been sensed in the SAS domain by operation of the SAS expander such that functional testing need be rerun.

Those of ordinary skill in the art will readily recognize that the methods of FIGS. 3 and 4 are intended merely as exemplary of one possible embodiment of features and aspects hereof. Numerous equivalent detailed methods will be readily apparent to those of ordinary skill and the art for sensing an appropriate change in the SAS domain such that functional testing may be rerun and for actually performing functional testing of components in the SAS domain.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for testing SAS components in a SAS domain having a SAS expander, the method comprising:
    sensing within the SAS expander a change in the SAS domain; and
    testing operation of a SAS component in the SAS domain in response to the sensed change to determine operational status of the SAS component.

2. The method of claim 1
    wherein the step of sensing further comprises sensing each new SAS component discovered by completion of a SAS discovery process performed within the SAS domain, and
    wherein the step of testing further comprises testing operation of each new SAS component.

3. The method of claim 1
    wherein the step of testing further comprises receiving self-test information from the SAS component.

4. The method of claim 1
    wherein the step of sensing further comprises sensing a reset of the SAS expander.

5. The method of claim 1
    wherein the step of sensing further comprises sensing receipt within the SAS expander of a BROADCAST-CHANGE primitive.

6. The method of claim 1
    wherein the step of sensing further comprises sensing restoration of a SAS PHY to an operable status.

7. The method of claim 1 wherein the step of testing further comprises:
    issuing a command to the SAS component; and
    determining a result of the issued command within the SAS component,
    wherein the command is non-destructive with respect to data stored in the SAS component.

8. The method of claim 7 wherein the SAS component is a SCSI device and wherein the non-destructive command is selected from the group of SCSI commands consisting of: Test Unit Ready, Inquiry, Read Capacity, Write Buffer, Read Buffer, and Read.

9. The method of claim 7 wherein the SAS component is a SATA device and wherein the non-destructive command is selected from the group of SATA commands consisting of: Execute Drive Diagnostics, Set Features, Read FPDMA Queued, Write Buffer, Read Buffer, and Read DMA Ext.

10. Apparatus within a SAS expander of a SAS domain for testing SAS components in the SAS domain, the apparatus comprising:
    sensing means for sensing a change in the SAS domain; and
    testing means for testing operation of a SAS component in the SAS domain in response to sensing of the change to determine operational status of the SAS component.

11. The apparatus of claim 10 further comprising:
    discovery means for performing a SAS discovery process in the SAS domain,
    wherein the sensing means is responsive to the discovery means to sense the change when a new SAS component is discovered by the SAS discovery process, and
    wherein the testing means are operable to test operation of each new SAS component.

12. The apparatus of claim 10
    wherein the testing means further comprises means for receiving self-test information from the SAS component.

13. The apparatus of claim 10
    wherein the sensing means further comprises means for sensing a reset of the SAS expander.

14. The apparatus of claim 10
    wherein the sensing means further comprises means for sensing receipt within the SAS expander of a BROADCAST-CHANGE primitive.

15. The apparatus of claim 10
    wherein the sensing means further comprises means for sensing restoration of a SAS PHY to an operable status.

16. The apparatus of claim 10 wherein the testing means further comprises:
    means for issuing a command to the SAS component; and
    means for determining a result of the issued command within the SAS component,
    wherein the command is non-destructive with respect to data stored in the SAS component.

17. The apparatus of claim 16 wherein the SAS component is a SCSI device and wherein the non-destructive command is selected from the group of SCSI commands consisting of: Test Unit Ready, Inquiry, Read Capacity, Write Buffer, Read Buffer, and Read.

18. The apparatus of claim 16 wherein the SAS component is a SATA device and wherein the non-destructive command is selected from the group of SATA commands consisting of: Execute Drive Diagnostics, Set Features, Read FPDMA Queued, Write Buffer, Read Buffer, and Read DMA Ext.

19. A SAS domain system comprising:
    a SAS initiator device; and
    a SAS expander communicatively coupled to the SAS initiator device wherein the SAS expander further comprises:
    a monitoring component to sense changes in SAS components in the SAS domain; and
    a testing component to test functionality of SAS components in the SAS domain in response to sensing a change in the SAS domain,
    wherein the monitoring component and the testing component are operable within the SAS expander without interaction with the SAS initiator device.

20. The SAS domain system of claim 19 further comprising:
    a notification component for notifying the SAS initiator device of the functionality of one or more SAS components of the SAS domain.

21. The SAS domain system of claim 19
    wherein the testing component is operable to issue a non-destructive command to the SAS component and to determine functionality of the SAS component based on the response of the SAS component to the issued command.

22. The SAS domain system of claim 21 wherein the SAS component is a SCSI device and wherein the non-destructive command is selected from the group of SCSI commands consisting of: Test Unit Ready, Inquiry, Read Capacity, Write Buffer, Read Buffer, and Read.

23. The SAS domain system of claim 21 wherein the SAS component is a SATA device and wherein the non-destructive command is selected from the group of SATA commands consisting of: Execute Drive Diagnostics, Set Features, Read FPDMA Queued, Write Buffer, Read Buffer, and Read DMA Ext.

* * * * *